Feb. 25, 1964     E. M. POLTER     3,122,166
MULTIWAY VALVE AND FLUID PRESSURE SEAL THEREFOR
Filed Aug. 16, 1961     2 Sheets-Sheet 2
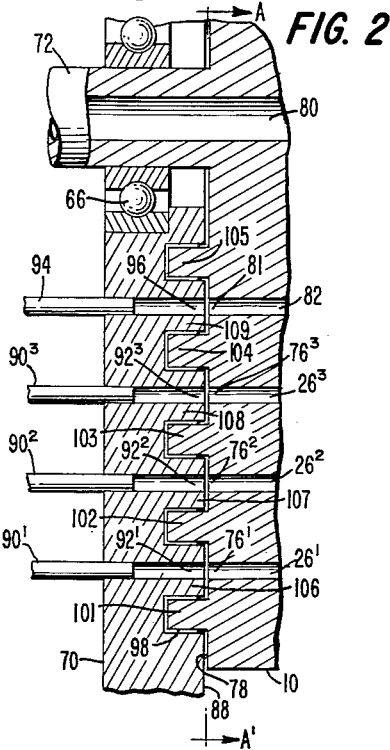
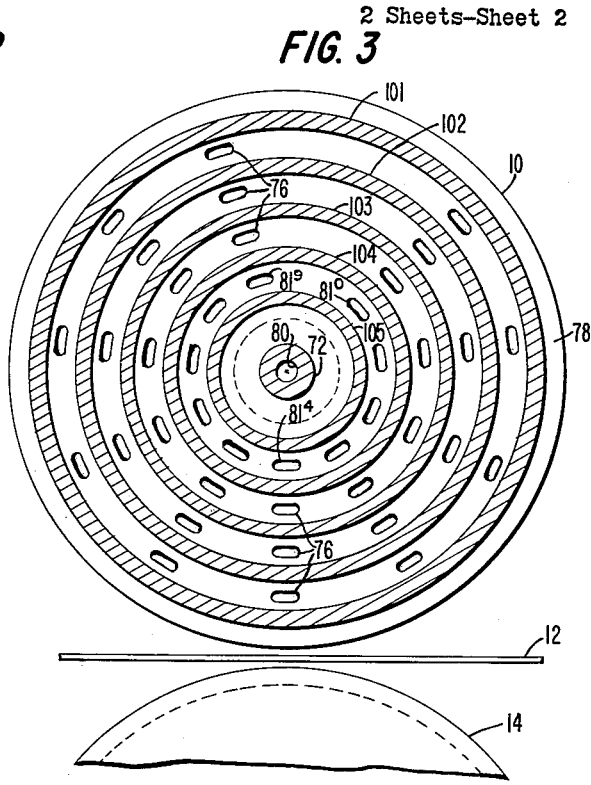
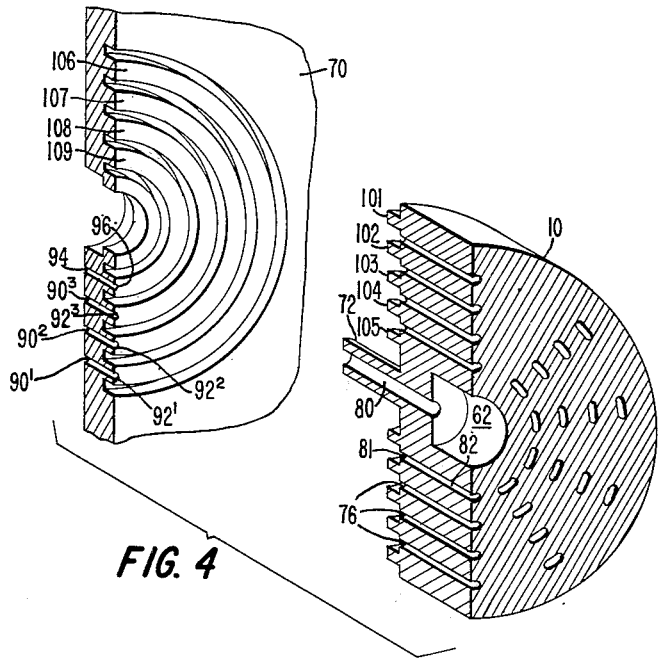

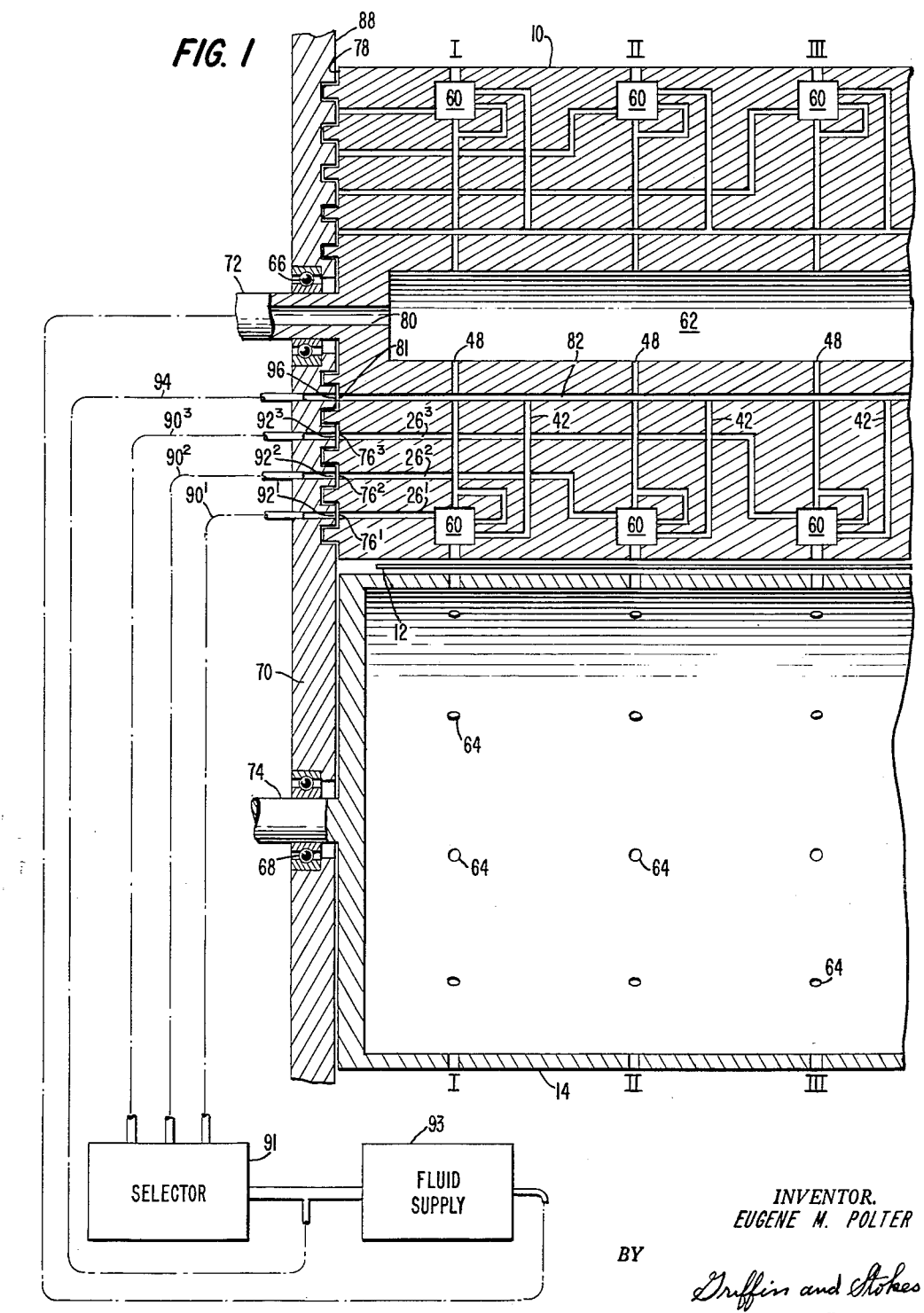

_United States Patent Office_ 3,122,166
Patented Feb. 25, 1964

3,122,166
MULTIWAY VALVE AND FLUID PRESSURE
SEAL THEREFOR
Eugene M. Polter, Philadelphia, Pa., assignor to Sperry
Rand Corporation, New York, N.Y., a corporation of
Delaware
Filed Aug. 16, 1961, Ser. No. 131,912
13 Claims. (Cl. 137—625.19)

The present invention relates to means for providing a fluid pressure seal, and more particularly to means whereby isolation may be accomplished, one from another, between a plurality of fluid passageways temporarily formed in members having relative motion therebetween.

In the rapidly developing field of fluid amplifier data processing systems, wherein digital control and information pulses are transmitted in a fluid medium, it is often desirable to transfer fluid pulses between mechanical members having relative motion therebetween. The invention disclosed herein is adapted to isolate a plurality of high pressure fluid lines one from another in the case where such lines have points of discontinuity occuring at the clearance between the members.

Therefore, an object of the present invention is to provide sealing means isolating each of a plurality of temporarily formed fluid passageways one from another, where each said passageway comprises first and second ducts terminated in ports respectively located in first and second mating surfaces having relative motion therebetween.

Another object of the present invention is to provide sealing means between points of discontinuity in adjacent fluid pressure lines which comprises a labyrinthian corridor between said points of discontinuity, together with lubricant located therein to develop a film which prevents leakage of fluid.

This invention is particularly adapted to provide means for making a plurality of fluid connections to a rotating drum without the intermixing of said connections. It may therefore be utilized as the sealing means between the rotating punch drum and stationary face plate of the card punch disclosed in pending U.S. application Serial No. 54,086, now Patent Number 3,059,842 filed September 6, 1960. In this application, O-ring seals or the like are employed to prevent the leakage of fluid from one high pressure control line into another or into the outside environment. However, the present invention provides a more positive type seal without causing any friction loss between the adjacent surfaces of the rotating drum and stationary plate.

It is therefore another object of the present invention to provide sealing means between a number of fluid pressure lines interconnected between a rotating drum member and a stationary face plate.

These and other objects of the present invention will be apparent during the course of the following description, which is to be taken in conjunction with the drawings, in which:

FIGURE 1 shows the use of the present invention in a card punch environment;

FIGURE 2 discloses a detailed sectional view of the present invention.

FIGURE 3 shows another sectional view of the invention; and

FIGURE 4 shows a pictorial section view of the invention.

FIGURE 1 of the drawings is a sectional view of the punch and die drums according to the invention disclosed and claimed in said above identified pending application and in which the present invention is particularly useful. The punch drum 10 comprises a substantially solid body surrounding a hollow core 62. A plurality of punches 60 are contained within the solid portion of drum 10 and arranged in a plurality of longitudinally extending rows circumferentially spaced about the periphery thereof. The number of punch rows depends upon the coding system employed and may, for example, consist of ten rows to enable the representation of numerical digits 0 through 9. The punches also are arranged in columns around the periphery of the drum so that one punch of each row lies in the same column as the corresponding punch of each of the other rows. For purposes of illustration only, three columns I, II, and III have been shown, but it is obvious to those skilled in the art that the number of columns is determined only by the number of character columns to be punched on the card.

The die drum 14 comprises an outer shell surrounding a hollow interior. The outer shell contains a plurality of holes 64, one for each of the punches 60. The punch and die drums are axially aligned with and capable of receiving successive punches 60 if the punches are extended through a card 12 passing between them. Bearings 66 and 68 mounted in stationary side plate 70 permit the punch and die drums 10 and 14, respectively, to be continuously driven by means of shafts 72 and 74 from any suitable drive means not shown.

As explained in said above identified pending application, in order to energize any of the punches 60, a relatively high pressure pulse is applied thereto via its associated control signal duct 26. There is a group of ducts 26 for each punch row, each group containing as many ducts as there are punches in the row. For example, control signal duct $26^1$ is associated with the punch 60 lying in column I of the row directly adjacent die drum 14 in FIGURE 1. When it is desired to energize punch 60, a pulse is applied via this control signal duct $26^1$ to one inlet of punch 60, and the punch is extended so as to be inserted into its complementary die hole 64 in drum 14. The retraction of punch 60 occurs when a pulse is subsequently applied via common duct 82 and individual duct 42 to a different inlet of the punch. An exhaust duct 48 is provided for each punch 60 to return the high pressure input pulses to the fluid source and thus create a closed system. As explained in the above identified pending application, one or more of the punches 60 lying in the row directly adjacent die drum 14 may be extended simultaneously if the same character must be recorded in more than one of the card columns. Thus, there may be two or more high pressure pulses simultaneously existing in the group of control signal ducts 26 associated with a punch row adjacent to the card.

Each of the control signal ducts 26 in each group terminates at a port or opening 76 in the end surface 78 of punch drum 10. Thus, for the embodiment being described, there are ten groups of three ports 76 spaced radially about axis 72. Each of the exhaust ducts 48 is connected to the hollow interior of drum 10 which in turn is connected via the passageway 80 in shaft 72 to the low pressure side of the external fluid supply 93. The control ducts 42 for each row of punches are connected to a common duct 82, as above described, which also terminates in a port 81 in the end surface 78. Thus, there are a total of ten ports 81 spaced about the drum axis 72 for the embodiment under consideration.

A plurality of control signal input ducts 90, equal in number to the ports 76 in any one of the groups, pass through the stationary side plate 70 and terminate at ports 92 in the inner plate surface 83. Each port $92^n$, of which there are three shown, is located a distance from axis 72 so that it will be successively aligned with a corresponding port $76^n$ in each of the groups as the punch drum rotates. Thus, port $92^1$ successively aligns with the port $76^1$ in each of the ten groups. However, ports 92 simultaneously align with the ports 76 belonging to the punch row directly adjacent the card, in order that actuating fluid pulses may be simultaneously applied to two or more punches. The control signal input ducts 90 are connected through a selective control device 91 to the high pressure side of the fluid supply 93. The selective control device may, for example, be one of the many types of pneumatic card sensing devices well-known in the art and does not comprise a part of the present invention. A single control duct 94 passes through the stationary side plate 70 and terminates at port 96 in the surface 88 thereof. Port 96 can be located a distance from axis 72 so that it will be successively aligned with each of the ports 81 as the drum rotates at times slightly subsequent to the alignment of ports 92 with ports 76 of corresponding punch rows.

From the above, it may be appreciated that as each punch row moves adjacent to card 12, a plurality of fluid passageways is temporarily formed each of which extends through end plate 70 and drum 10 and through which a fluid pulse from selector 91 may be applied to a punch 60.

Each such passageway is comprised of two ducts, $90^n$ and $26^n$, which are respectively located in members having relative motion therebetween. For example, duct $90^1$ is located in stationary plate 70, and the corresponding duct $26^1$ is located in drum 10. However, each of said temporarily formed passageways has a point of discontinuity occurring at the ports $92^n$ and $76^n$ of its respective ducts $90^n$ and $26^n$. Inasmuch as a certain minimum clearance is desirable between the drum 10 and plate 70 to avoid wear of the mating surfaces 88 and 78 and to reduce friction loss, pulses traversing the clearance distance between ports $92^n$ and $76^n$ may leak into the space between said mating surfaces. Any fluid thus escaping from its passageway may travel to either the outside environment, or to the ports $76^{n+1}$ or $76^{n-1}$ of the adjacent temporarily formed passageways. Any of these alternatives is undesirable, since, for example, a punch 60 may be falsely actuated by such leakage fluid entering an adjacent passageway.

In order to prevent the leakage of fluid from one temporarily formed high pressure passageway to another because of the points of discontinuity engendered by the clearance between plate 70 and drum 10, the mating surfaces 88 and 78 are interleaved according to the present invention in such a manner to form a labyrinthian corridor between the port locations of adjacent passageways. A lubricant is located within the corridors thus formed such that when the drum is rotating at its operating speed, a hydrodynamic film develops between the stationary and moving surfaces within the corridors. This film blocks the leakage of high pressure pulse fluid into contiguous passageways, thereby isolating each pressure line. The details of these corridors are shown in FIGURE 2 which is an enlarged view of the lower left portion of drum 10 and plate 70. The end mating surface 78 of drum 10 is formed in a plurality of ridges or protrusions 101 through 105 which have basically a rectangular cross-section in the preferred embodiment, although not limited thereto. These protrusions are concentric about the axis of drum 10 rotation. Between adjacent pairs of protrusions 101 through 105 are corresponding valleys in which are located the ports 76 and 81 of respective ducts 26 and 82. Mating surface 88 of stationary plate 70 is likewise formed in a plurality of matching and complementary concentric protrusions 106 through 109 having corresponding valleys therebetween into which are interleaved protrusions 101 through 105 of drum 10. The clearance between mating surfaces 88 and 78 should be quite small and precise, being generally on the order of 0.001" to 0.010", and may be maintained so because of the presence of bearing 66 which prevents motion of drum 10 in a direction transverse to its axis of rotation. Ducts 90 and 94 have respective ports 92 and 96 located in the protrusions 106 through 109 so that alignment between said last named ports and various ones of ports 26 and 81 will occur as drum 10 rotates.

As shown in FIGURE 2, mating surfaces 88 and 78 have relative motion therebetween only in a direction normal to the plane of the paper. No matter what the angular position of drum 10, surfaces 88 and 78 are interleaved in such a manner that a corridor is maintained between pairs of associated ports $92^n/76^n$ and $92^{n+1}/76^{n+1}$ of adjacent temporarily formed passageways. Each corridor thus partially isolates the adjacent passageways one from the other by creating a tortuous route through which any leakage fluid must pass. However, the present invention includes a positive means of isolating the fluid passages. A lubricant is located within the labyrinthian corridors so formed between the mating surfaces 88 and 78. When the drum 10 is rotating at its operating speed, a hydrodynamic film 98 develops between the stationary and moving mating surfaces. This film blocks the leakage of any relatively high pressure pulse fluid from the passageway ports through a corridor into the ports of an adjacent passageway. Therefore, each of the passageways is isolated one from another. Well substantiated theory has shown that the film thickness formed within the corridor is directly proportional to the lubricant viscosity and speed of the moving surface, and inversely proportional to the drag force exerted by the fluid on the moving surface. The above may be mathematically expressed by the following equation:

$$d = \frac{uAv}{F}$$

where
$d$ = film thickness;
$u$ = absolute viscosity, or in other words, the resistance offered by the fluid lubricant to shearing;
$A$ = the area of the contacting mating surfaces;
$v$ = the relative velocity between the two members; and
$F$ = the drag force exerted by the fluid on the moving surface.

As stated before, the range of clearances between the mating surfaces 88 and 78 may be of the order of 0.001" to 0.010". Ordinarily, this range would be much smaller if the mating surfaces carried a load. In the particular environment shown, that of providing isolation between the high pressure passageways in a card punch, no load is present on these surfaces since bearing 66 supports drum 10 in stationary plate 70. Therefore, the clearance can be larger and still maintain an unbroken film therein. By merely changing the viscosity of the lubricant or the clearance between mating surfaces 88 and 78, the invention is capable of use in apparatus having a relatively wide range of operating speeds.

FIGURE 3 of the drawings illustrates a view of the end surface of drum 10 taken in section along A—A' in FIGURE 2. This figure emphasizes the concentric ring construction of the protruded end surfaces, as well as showing the radial arrangement of the groups of ports 76 and 81 associated with the punch rows. The shapes of these ports are preferably rectangular in the direction of motion, or some other suitable shape, in order to provide flexibility of punch timing. FIGURE 4 is a pictorial sectional view of the invention which shows the concentricity of the mating surface protrusions.

Although the present invention has been described for use in the rotating card punch drum, such as disclosed in the above identified pending application, it is evident that the principles here explained may be applied to other environments. For example, one mating surface may have a reciprocating or similar motion with respect to another, wherein each would be formed in a plurality of straight parallel protrusions instead of the circular concentric protrusions necessary in the card punch device. Many other modifications may likewise be evident to one skilled in the art without departing from the spirit of the invention as defined in the appended claims.

I claim:
1. Sealing means for isolating each of a plurality of relatively high pressure fluid passageways one from another, where each said passageway comprises first and second ducts terminated in ports respectively located in first and second mating surfaces, with said mating surfaces being adjacent and having means for producing relative velocity between said surfaces to selectively align the ports of corresponding first and second ducts of the same passageway to allow the transmission of relatively high pressure fluid therethrough, said sealing means comprising; a labyrinthian corridor between the port locations of each successive pair of fluid passageways, said corridor being formed by an interleaving of said first and second mating surfaces, and lubricant located within said corridors between said mating surfaces, said velocity producing means producing a velocity of sufficient magnitude to establish a hydrodynamic film to thereby prevent leakage of fluid between the ports of adjacent passageways.

2. Sealing means according to claim 1 wherein the clearance between said mating surfaces is in the range from 0.001 inch to 0.010 inch, inclusive.

3. Sealing means according to claim 1 wherein said first mating surface is stationary and said second mating surface is in motion.

4. Sealing means according to claim 3 wherein the clearance between said mating surfaces is in the range from 0.001 inch to 0.010 inch, inclusive.

5. In apparatus having a moving first member one surface of which is adjacent to a surface of a stationary second member, said apparatus also having means for producing relative velocity between said surfaces during an index operation of said first member, where said stationary member contains a plurality of first fluid ducts each terminated in a port located in its said surface and said moving member contains a plurality of second fluid ducts each terminated in a port located in its said surface at a position such as to be moved into alignment with a first duct port individual thereto during an index operation in order to form a passageway through said members for relatively high pressure fluid, the provision of sealing means for isolating each of said fluid passageways one from another, comprising: a labyrinthian corridor between the port positions of each successive pair of fluid passageways, said corridor being formed by an interleaving of said adjacent first and second member surfaces, and lubricant located within said corridor, said velocity producing means producing a velocity of sufficient magnitude to establish a hydrodynamic film to thereby prevent leakage of fluid between the ports of adjacent passageways.

6. The invention according to claim 5 wherein the clearance between said mating surfaces is in the range from 0.001 inch to 0.010 inch, inclusive.

7. Apparatus comprising a first member one surface of which has a portion formed in a first plurality of parallel protrusions and corresponding valleys therebetween, a second member one surface of which has a portion formed in a second plurality of parallel protrusions and corresponding valleys therebetween, which are complementary to and interleaved with said first plurality so as to mate with respective ones of said first member valleys and vice versa, means for producing relative velocity between said first and second member surfaces, at least one port located in each of said second member protrusions for the passage of relatively high pressure fluid therethrough, at least one port located in each of said first member valleys for the passage of relatively high pressure fluid therethrough and with which the corresponding interleaved protrusion port matches as one of said members moves with respect to the other, and lubricant located within each region where said first member protrusions mate with said second member valleys, said velocity producing means producing a velocity of sufficient magnitude to establish a hydrodynamic film between said mating surfaces to thereby prevent leakage of fluid between the port locations of adjacent passageways.

8. Apparatus according to claim 7 wherein the clearance between said mating surfaces is in the range from 0.001 inch to 0.010 inch, inclusive.

9. Apparatus according to claim 7 wherein one of said members has a plurality of high pressure ports located in each of its respective mating surfaces, each port of a said plurality being successively matched with the port of the corresponding mating surface of the other member as they move with respect to each other.

10. Apparatus comprising a rotatable drum one end surface of which has a portion formed in a first plurality of protrusions and corresponding valleys therebetween, which are concentric about its axis of rotation, a stationary side plate one surface of which has a portion formed in a second plurality of concentric protrusions and corresponding valleys therebetween which are complementary to and interleaved with said first plurality so as to mate with respective ones of said drum valleys and vice versa, at least one port located in each of said stationary plate protrusions for the passage of relatively high pressure fluid therethrough, at least one port located in each of said drum valleys for the passage of relatively high pressure fluid therethrough and with which the corresponding interleaved stationary protrusion port matches as said drum rotates in order to transfer fluid therebetween, lubricant located within each region where said drum protrusions mate with said stationary plate valleys which serves to establish a hydrodynamic film between said mating surfaces to thereby prevent leakage of fluid between the ports of adjacent passageways when said drum is rotated at a predetermined minimum velocity, and means for rotating said drum at least at said predetermined velocity to thereby establish said film.

11. Apparatus according to claim 10 wherein the clearance between said mating surfaces is in the range from 0.001 inch to 0.010 inch, inclusive.

12. Apparatus according to claim 10 wherein each of said drum valleys has a plurality of ports each of which successively matches with the corresponding stationary protrusion port as said drum rotates.

13. Apparatus according to claim 12 wherein the clearance between said mating surfaces is in the range from 0.001 inch to 0.010 inch, inclusive.

References Cited in the file of this patent

UNITED STATES PATENTS

| | | |
|---|---|---|
| 886,013 | Paul | Apr. 28, 1908 |
| 913,407 | Ljungstrom | Feb. 23, 1909 |
| 1,975,230 | Jewett | Oct. 2, 1934 |
| 2,153,774 | Poitras | Apr. 11, 1939 |
| 2,172,222 | Podbielniak | Sept. 5, 1939 |
| 2,706,532 | Ringo | Apr. 19, 1955 |